(12) United States Patent
Baxter et al.

(10) Patent No.: US 9,714,846 B2
(45) Date of Patent: Jul. 25, 2017

(54) DISPLACEMENT MEASURING DEVICE WITH CAPACITIVE SENSING

(71) Applicant: Chicago Dial Indicator Company, Des Plaines, IL (US)

(72) Inventors: Larry K Baxter, Gloucester, MA (US); Gerardus C. M. Meijer, Delft (NL)

(73) Assignee: Chicago Dial Indicator Company, Des Plaines, IL (US)

(*) Notice: Subject to any disclaimer, the term of this patent is extended or adjusted under 35 U.S.C. 154(b) by 172 days.

(21) Appl. No.: 14/226,168

(22) Filed: Mar. 26, 2014

(65) Prior Publication Data

US 2015/0185049 A1    Jul. 2, 2015

Related U.S. Application Data

(60) Provisional application No. 61/922,233, filed on Dec. 31, 2013.

(51) Int. Cl.
    *G01R 27/26* (2006.01)
    *G01D 5/241* (2006.01)

(52) U.S. Cl.
    CPC .................. *G01D 5/2412* (2013.01)

(58) Field of Classification Search
    CPC ...... G01D 5/2415; G01D 11/245; G01D 5/24; G01D 5/2405; G01B 3/205; G01B 5/061; G01R 1/06727; G01R 27/2605; G05B 19/21; G05B 2219/37275; H02N 1/004
    USPC ................... 324/658–663; 318/662
    See application file for complete search history.

(56) References Cited

U.S. PATENT DOCUMENTS

| | | | |
|---|---|---|---|
| 3,760,254 A * | 9/1973 | Hardway, Jr. | G05D 3/124 318/662 |
| 4,420,754 A | 12/1983 | Andermo | |
| 4,437,055 A | 3/1984 | Meyer | |
| 4,586,260 A | 5/1986 | Baxter et al. | |
| 4,743,902 A | 5/1988 | Andermo | |
| 4,841,225 A | 6/1989 | Meyer | |
| 4,878,013 A | 10/1989 | Andermo | |
| 4,879,508 A | 11/1989 | Andermo | |
| 4,959,615 A | 9/1990 | Andermo | |
| 5,731,707 A | 3/1998 | Andermo | |
| 6,492,911 B1 * | 12/2002 | Netzer | G01D 11/245 318/662 |
| 6,538,457 B2 | 3/2003 | Nakayama et al. | |

* cited by examiner

*Primary Examiner* — Vincent Q Nguyen
(74) *Attorney, Agent, or Firm* — Erickson Law Group, PC

(57) ABSTRACT

A dial indicator for accurately measuring displacement of a part along a measurement axis. The dial indicator includes scale electrodes of a given pitch and reader stationary scale electrodes of a given pitch. A reader carries a plurality of reader bars having a pitch of one half that of the scale electrodes. A set of drive signals of a given frequency are applied in different ways to the scale bar electrodes to achieve coarse and fine positions of the reader relative to the scale. One operating mode involves determining the position of the reader 34 with a coarse measurement relative to the scale, and a fine measurement. These signals can combined to obtain an accurate position over the reader and position of a spindle reading displaced.

40 Claims, 16 Drawing Sheets

DISPLACEMENT MEASURING DEVICE WITH CAPACITIVE SENSING

CROSS-REFERENCE TO RELATED APPLICATION

This application claims priority from U.S. Provisional Application Ser. No. 61/922,233 filed Dec. 31, 2013 for a Displacement Measuring Device with Capacitive Sensing which is hereby incorporated by reference.

BACKGROUND OF THE INVENTION

Field of the Invention

This invention generally relates to linear displacement measuring devices with capacitive sensing and more particularly to such devices known as "dial indicators."

Description of Related Art

Broadly, linear displacement measuring devices, such as dial indicators, measure position by determining a linear displacement of a spring-loaded spindle rod. Early implementations of such dial indicators included precision gearing to translate the linear spindle motion into rotation of a needle over a dial. More recently, efforts have been directed to reducing the mechanical complexity of such dial indicators by incorporating electronics, particularly digital electronics, to increase measurement accuracy and operational reliability.

One prior art approach incorporates capacitive sensors to generate position dependent measurements. In such a dial indicator a first stationary support carries an array of signal transmitting electrodes and forms a "slide" or "scale." A second support undergoes relative motion with respect to the first support and carries receiving electrodes. The receiving electrodes and second support form a "scale" or "slide" or "reader" that undergoes motion relative to the stationary support. In the following discussion "scale" designates the first or stationary support and transmitting electrodes; "reader" designates the second or movable support and receiving electrodes.

The reader electrodes and scale electrodes are closely spaced in an overlying relationship forming capacitors in which the capacitance between the scale electrodes, or "bars," varies as the reader moves. Processing electronics convert the received signals into a position measurement and display the position of the spring-loaded spindle relative to a reference position.

Prior art dial indicators that utilize capacitive sensing provide relative position measurements where the indicator is positioned at a convenient reference point and a "zero" button is pressed. All measurements then are relative to this position until the unit is powered down or re-zeroed. A dial indicator using relative position measurements does not "know" actual position of the spindle, just its relative motion. With absolute position measurement, the indicator "knows" the exact position of its spindle at all times. A relative zero can still be set, and it is not lost if the unit is powered down.

At times the velocity of the reader and spindle relative to the scale can increase and overload the operating capabilities of processing electronics thereby introducing ambiguities and potentially affecting measurement accuracy. Some prior art dial indicators overcame this problem by providing a dial indicator with "absolute" position sensing.

Other prior art dial indicators utilize independent precise and simultaneous measurements of multiple input signals. However, such systems can be sensitive to manufacturing tolerance variations. One solution includes one set of electrodes to make fine measurement and a second set of electrodes to make coarse measurements. Such arrays are difficult to implement and necessitate construction of electrode arrays to tolerances that are difficult to achieve. As a result, such dial indicators with the ability to provide absolute position are expensive to manufacture.

Electronic dial indicators are subject to both the effects of mechanical and electronic tolerances. Factory calibration is particularly important when implementing absolute positioning. Consequently, it is advantageous to provide a means for combining calibration information and actual measurement data being processed during a measurement operation. For ease of use, dial indicators can be battery operated. Prior dial indicators with absolute and incremental position measurement capabilities need to be continuously energized during measurements so that a zero reference is not lost and thus have power requirements that can shorten battery life and thus require either periodic battery replacement or battery recharging. These characteristics have reduced the demand for such measurement devices because battery-operated prior art devices have a short battery life.

What is needed is a dial indicator with capacitive sensors that provides accurate readings for relative and absolute positions, that is easily calibrated and that extends battery life.

BRIEF SUMMARY OF THE INVENTION

Therefore it is an object of this invention to provide a linear displacement measurement device utilizing capacitive sensing for generating accurate position and displacement measurement values.

Another object of this invention is to provide a linear displacement measurement device with capacitive sensing to provide accurate absolute and relative measurement values.

Yet another object of this invention is to provide a linear displacement measurement device utilizing capacitive sensing that facilitates the implementation of device measurement calibration.

Yet still another object of this invention is to provide a linear displacement measurement device with capacitive sensors that provides accurate relative and absolute position information with minimal power requirements.

Therefore it is an object of this invention to provide a dial indicator utilizing capacitive sensing for generating accurate position and displacement measurement values.

Another object of this invention is to provide a dial indicator with capacitive sensing to provide accurate absolute and relative measurement values.

Yet another object of this invention is to provide a dial indicator utilizing capacitive sensing that facilitates measurement calibration.

Yet still another object of this invention is to provide a dial indicator device with capacitive sensors that provides accurate relative and absolute position information with minimal power requirements.

In accordance with one aspect of this invention, a linear measurement device includes a scale, a reader and a positioning measurement processor that determines a position value for display. The scale has a first plurality of scale bars extending along a measurement axis and a scale bar energizer for energizing said scale bars. The reader has a second plurality, less than the first plurality, of reader bars extending along the measurement axis. The reader is displaced relative to the scale along the measurement axis whereby each of said reader bars is capacitively coupled to different ones of said scale bars. The positioning measurement processor couples the signals on the scale that are capacitively coupled to the reader bars for generating the position measurement. A display presents the position.

In accordance with another aspect of this invention, a dial indicator for measuring the distance from a reference to a target comprises a housing for being positioned at the reference position, a spindle supported by the housing for contacting the target by displacement in the housing along a spindle axis. The housing supports a scale including an array of scale electrodes extending along a distance corresponding to a maximum measurement distance at a scale electrode pitch. A reader supported by said spindle includes an array of reader bars extending along a distance that is less than the maximum measurement distance. The reader bars have a pitch that is less than the pitch of the scale electrodes and are spaced from and overlap the scale electrodes thereby to form capacitors. A signal generator energizes all the scale electrodes. An output generator connected to the reader bars generates an output based upon the position of the reader relative to the scale. A display presents the distance from the reference to the target in response to the output from the output generator.

DETAILED DESCRIPTION OF THE INVENTION

Figure 1:
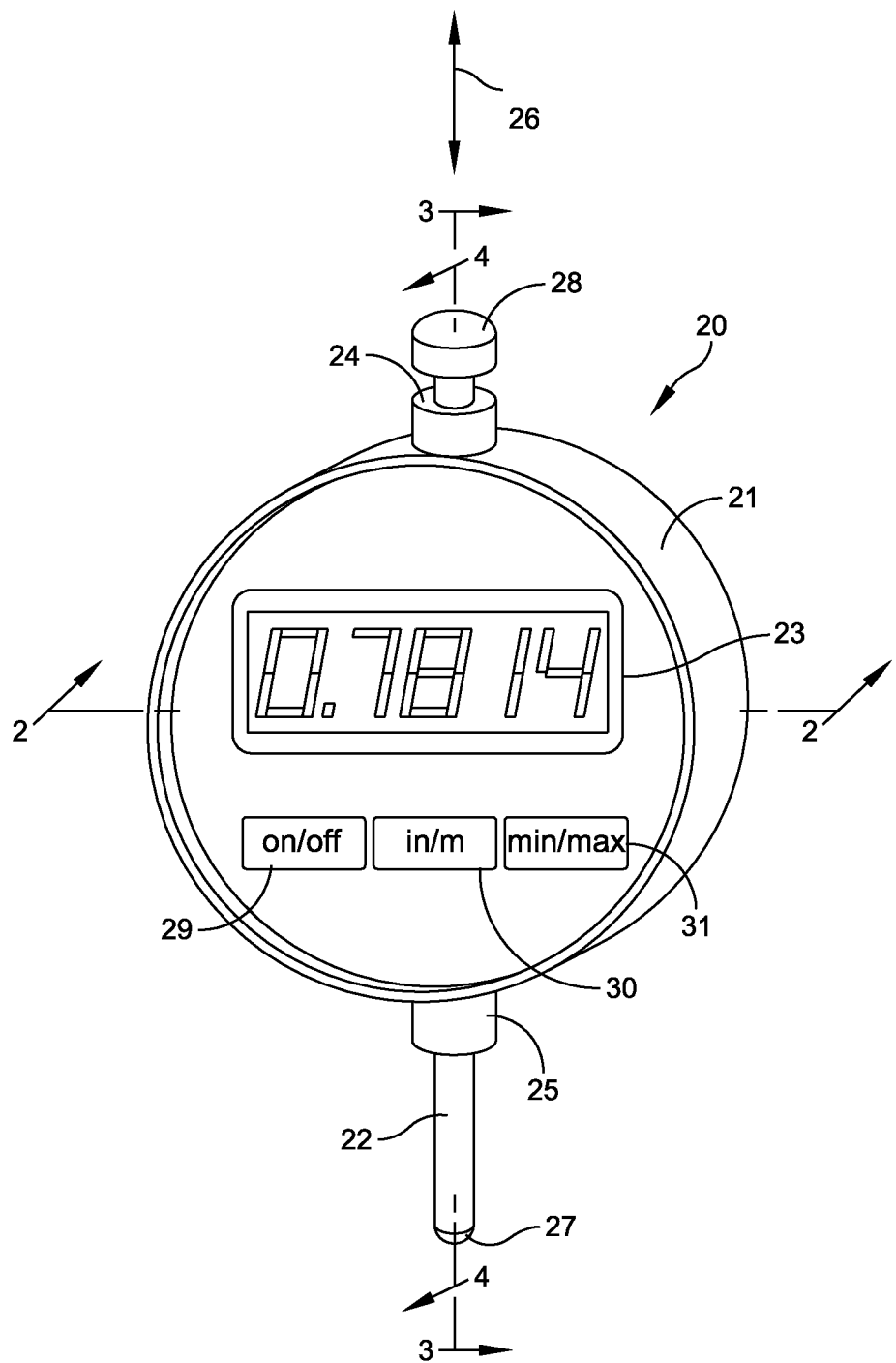
FIG. 1 is a perspective view of a dial indicator embodying this invention.

FIG. 1 depicts, as a specific embodiment of a linear measurement system of this invention, a dial indicator 20. A case or housing 21 contains various components that provide a measurement of the displacement of a spindle rod 22 on an alphanumeric display 23. Upper and lower journals 24 and 25 support the spindle rod 22 for reciprocal motion relative to the housing 12 in the direction of an arrow 26, a vertical motion in the orientation of FIG. 1. Either one or both of the journals 24 and 25 or other support structure provides a means for locating the dial indicator 20 to a fixture that positions the dial indicator at a reference location. Such fixtures are known in the art. A working tip 27 at the end of the spindle rod 22 engages a work piece (not shown). A cap 28 at the other end of the spindle rod 22 limits its extension to a fully extending reference position.

Still referring to FIG. 1, the housing 21 also supports a plurality of switches that perform various functions. A power selection switch 29 controls the operation of the dial indicator 20 by providing power from a disposable or rechargeable battery or other power source (not shown, but known in the art). A dimension selection switch 30 enables an operator to display a measured displacement value in according to a selected one of U.S. standard or metric measurement units. A "min/max" selection switch 31 permits an operator to select one of a plurality of operating modes as described later.

Figure 2:
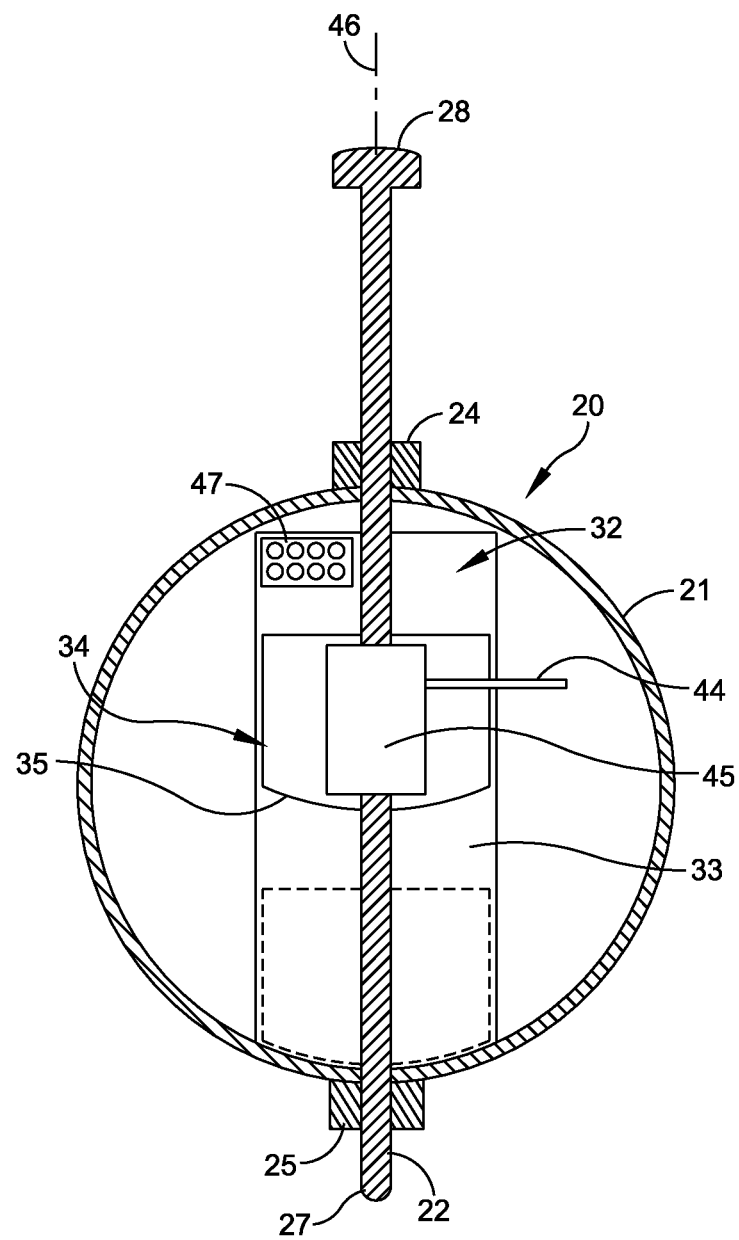
FIG. 2 is a cross section of the dial indicator taken along lines 2-2 of FIG. 1.
Figure 3:
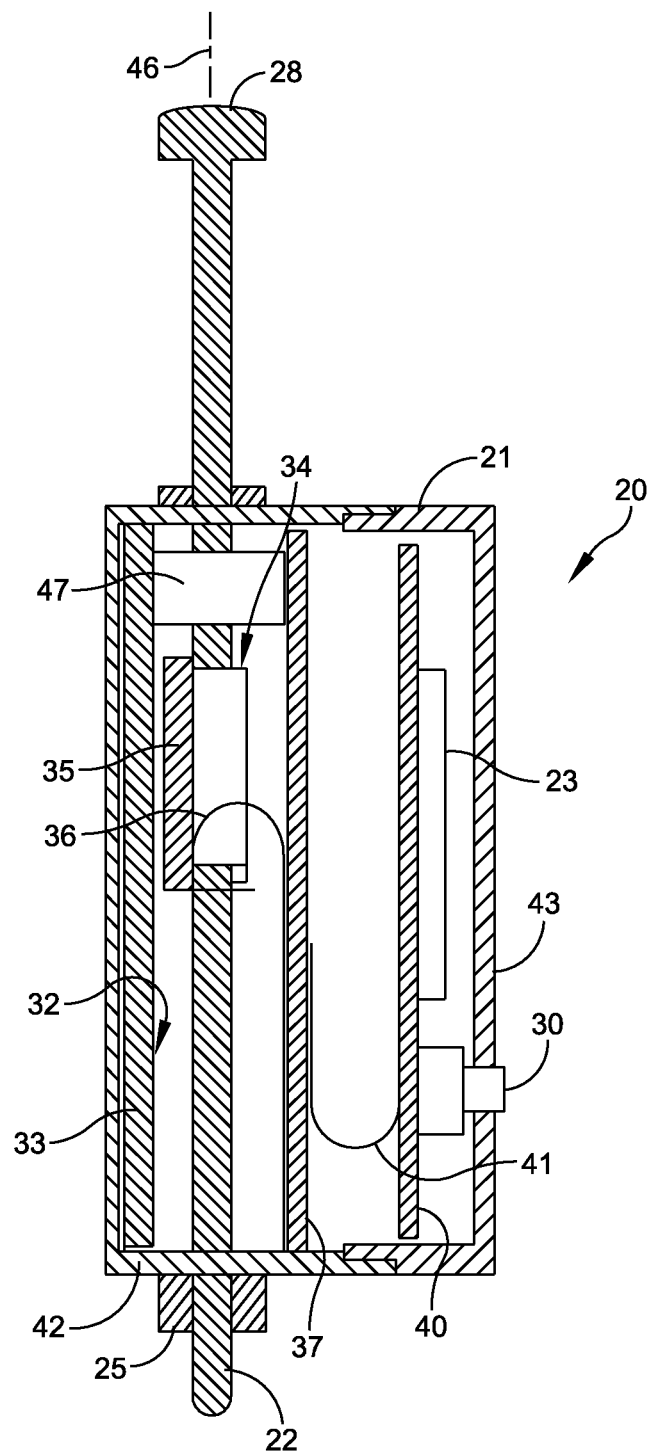
FIG. 3 is another cross-section of the dial indicator taken along lines 3-3 of FIG. 1.
Figure 4:
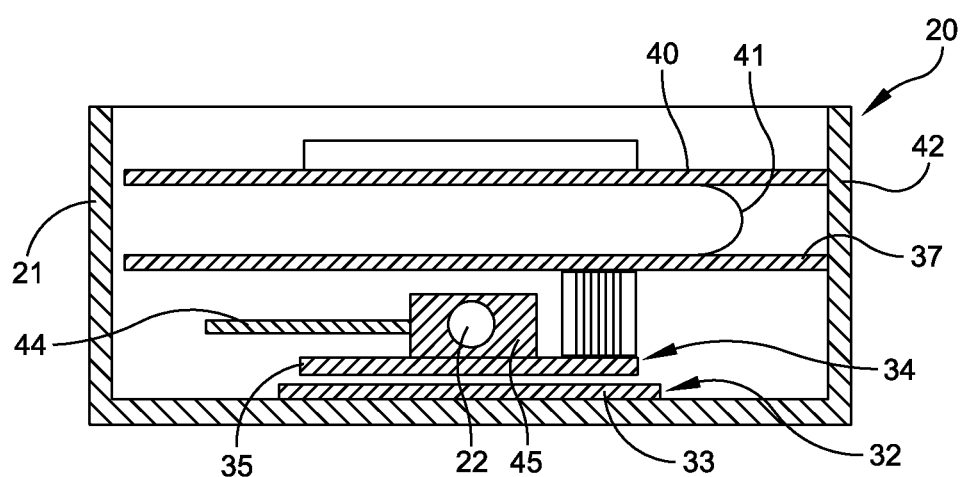
FIG. 4 is yet another cross-section of the dial indicator taken along lines 4-4 in FIG. 1.

In FIGS. 2 through 4, the housing 21 of the dial indicator 20 supports a scale 32 that includes a scale circuit board 33 that extends across the housing 21, that is centered on the spindle rod 22 and that is fixed in the housing 21. The scale circuit board 33 carries an array of transmitting electrodes or "scale bars" as described later. A reader 34 attaches to the spindle rod 22 and includes a reader circuit board 35 and an array of receiving electrodes, or "reader bars" and output amplifiers also described later. A flexible cable 36 in FIG. 3 interconnects the output amplifiers on the reader 34 and a third circuit board 37. Another circuit board 40 carries the display 23 and the switches 29, 30 and 31 and connects to the reader circuit board 35 by means of a second flexible cable 41. FIG. 3 depicts the dimension selection switch 30.

Referring specifically to FIG. 3, the housing 21 comprises a cup-shaped main body portion 42 and a front counter-facing cylindrical portion 43. The two housing portions 42 and 43 are preferably connected together with a structure that allows the cylindrical portion 43 to rotate relative to the main body portion 42 for purposes of orienting the display 23 and switches 29 through 31 in the vertical position as shown in FIG. 1 notwithstanding the orientation of the reader 45 contained in the main body portion 42. The flexible cable 41 couples the circuitry on the circuit boards 37 and 40 during such rotation.

Referring again to FIGS. 2 and 4, the dial indicator 20 includes a locating pin 44 mounted to a hub 45 on the reader 34 that travels in a slot (not shown) parallel to an axis 46 to limit any rotational motion of the reader 34 about the axis 46. As shown in FIGS. 2 and 3, a connector 47 provides an electrical connection between the electrode array on the scale 32 and circuitry on the circuit board 37.

Figure 5:
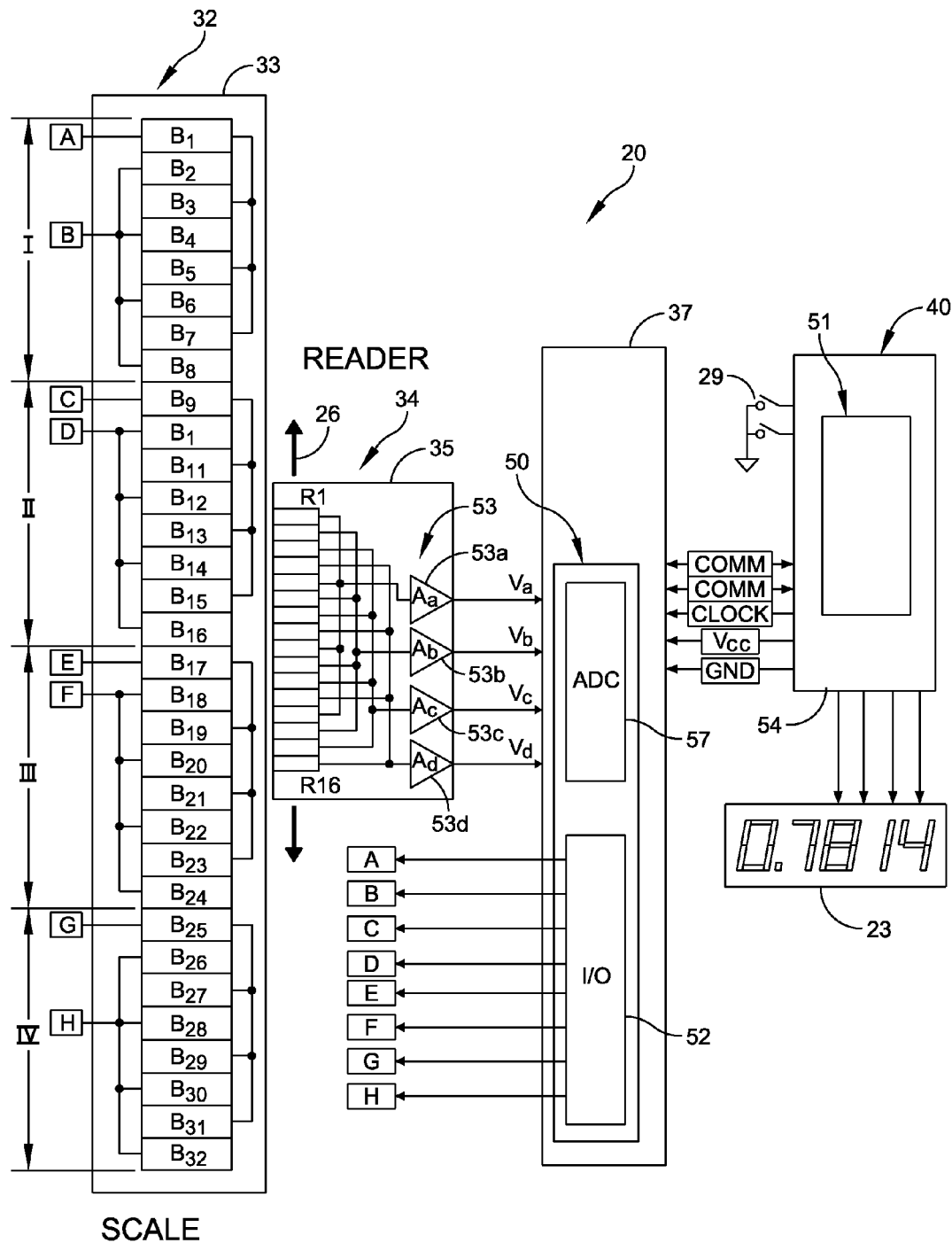
FIG. 5 is a functional block diagram that discloses the major components of the dial indicator including a scale and reader of FIG. 1 in diagrammatic form.

FIG. 5 depicts, in schematic form, various electronic components that populate the circuit boards 37 and 40 and details of the scale 32 and reader 34. In this view the spindle rod 22 of FIGS. 1 through 4 and the affixed reader 34 move along a path designated by arrows 26 while the scale 32 is affixed to the housing 21. FIG. 5 depicts the scale 32 and reader 34 in a side-by-side orientation.

Figure 6:
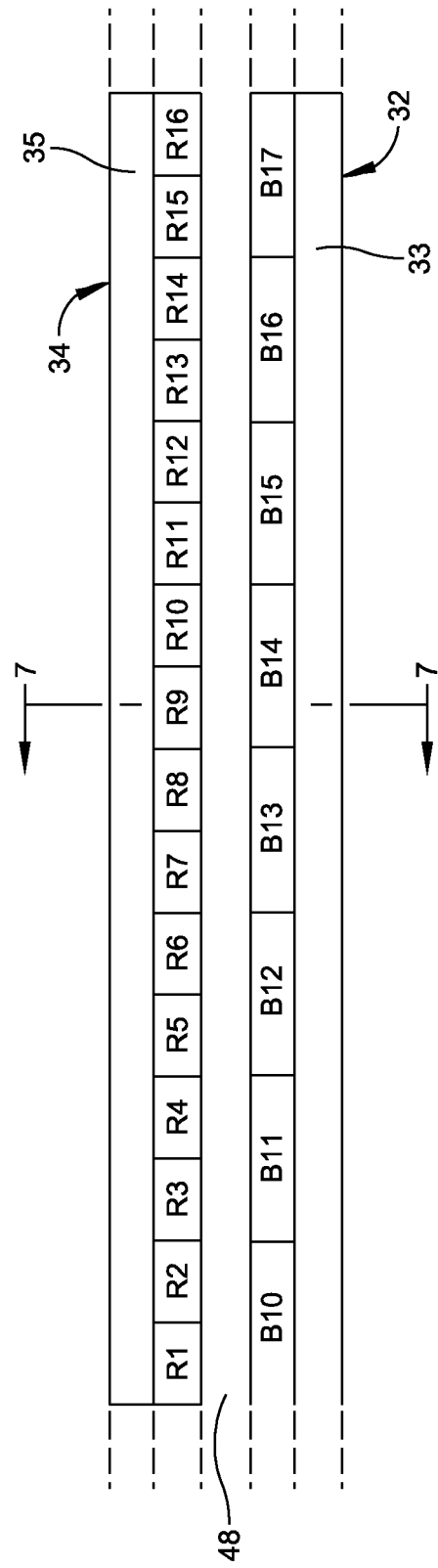
FIG. 6 is a cross-section of a portion of the dial indicator of FIG. 1 that depicts a first spatial relationship of the scale and reader.
Figure 7:
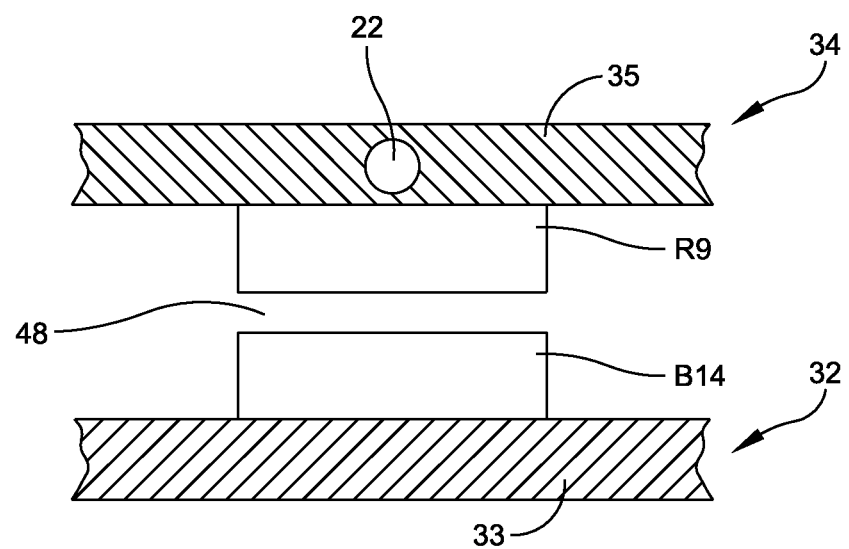
FIG. 7 is another cross section that depicts a second physical relationship between the scale and reader shown in FIG. 5.

As known, however, in such a system the electrodes of the scale 32 and the reader 34 will be in overlapping relationship. More specifically, FIGS. 6 and 7 are two cross-sections of the scale 32 and the reader 34 taken along an axis parallel to the axis 46 and transverse to the axis 46, respectively and shown in FIGS. 2 and 3. FIG. 6 depicts a portion of the scale 32 including scale bars B10 through B17 on the circuit board 33 and the reader 34 with reader bars R1 through R16 on the reader circuit board 35. The cross-section in FIG. 7 is taken transversely to the spindle rod 22. In this view, the scale circuit board 33 supports the scale bar B14, The reader circuit board 35 is attached to the spindle rod 22 thereby to establish an air gap 48. The extents of the scale bars and the reader bars in this view are approximately the same. As described later, in this configuration, rotation of the spindle rod that increases the gap on one side of the reader bars will result in an offsetting decrease in the gap on the other side of the spindle rod 22.

Referring again to FIG. 5, each of the sixteen reader bars (R1 through R16) has a pitch that is one-half the pitch of the scale bars. Thus as the reader 34 moves, there are positions where two adjacent reader bars align with one scale bar. FIG. 6 depicts this state where, for example, the R1 and R2 reader bars are aligned with the B10 scale bar. The scale 32 divides the scale bars into blocks of adjacent scale bars. In the specifically disclosed dial indicator of this invention, the scale bars are grouped into four "quadrants" of eight scale bars as follows:

TABLE 1

| Quadrant | Scale bars |
| --- | --- |
| I | B1-B8 |
| II | B9-B16 |
| III | B17-B24 |
| IV | B25-B32 |

In the specific example of FIG. 5, the reader 34 is shown at a position where the reader bars spans portions of the scale bars in Quadrants II and III.

Still referring to FIG. 5, the circuit board 37 includes an ultra-low-power microcontroller 50 that functions to obtain position information during a first or "coarse" operational mode and a second or "fine" operational mode as described in more detail later. A second ultra-low power microcontroller 51 mounted on the circuit board 40 communicates with the microcontroller 50 and performs various functions including generating information that appears in the LCD display 23. Silicon Labs ARM® Cores microcontrollers constitute one example. Other equivalent microcontrollers could be substituted and the components populating any one disclosed circuit board could be modified.

During operation, the microcontroller 50 generates constant-frequency, phase-shifted square waves at terminals A through H from an input-output ("I/O") module 52 for energizing the scale bars B1 through B32. The microcontroller 50 controls the sequencing or relationship of the square waves at each terminal differently during the "coarse" and "fine" measurements as described later.

Figure 8:
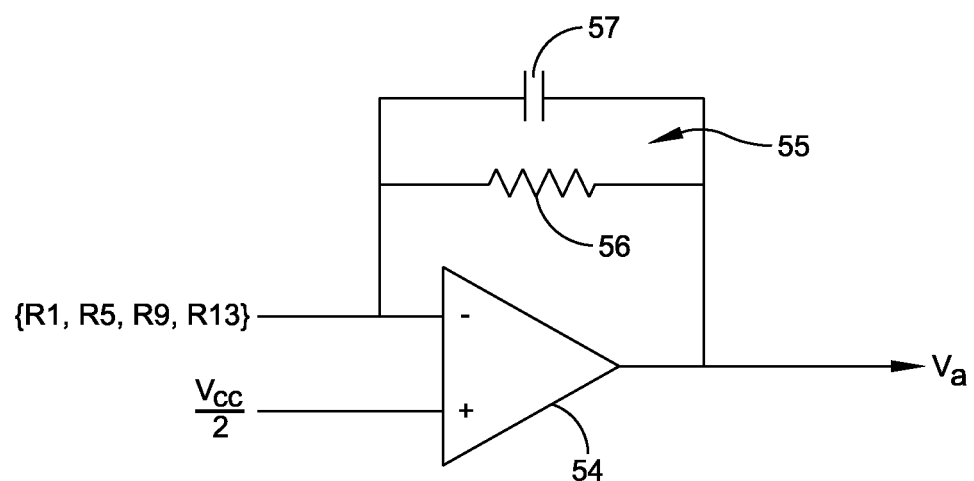
FIG. 8 is a schematic of one embodiment of a current-to-voltage amplifier that can be used on the reader in accordance with this invention.

Each of the reader bars R1 through R16 provides an input to one of a plurality of analog current-to-voltage converters in an amplifier array 53 including amplifiers $A_a$, $A_b$, $A_c$, and $A_d$. Such current-to-voltage converters are known in the art. FIG. 8 depicts an embodiment with an operational amplifier 54 and a negative feedback circuit 55 comprising a feedback resistor 56 and parallel capacitor 57. A reference voltage, $V_{cc}/2$, is applied to the non-inverting input of the operational amplifier 54 wherein $V_{cc}$ is a supply voltage.

The operation of the reader 34 with the circuit of FIG. 8 sums the signals from multiple reader bars as follows:

TABLE 2

| Amplifier | Input From Reader Bars | Amplifier Array Output |
| --- | --- | --- |
| 53a | R1, R5, R9, R13 | $V_a$ |
| 53b | R2, R6, R10, R14 | $V_b$ |
| 53c | R3, R7, R11, R15 | $V_c$ |
| 53d | R4, R8, R12, R16 | $V_d$ |

Specifically, in FIG. 5, an analog-to-digital converter 57 in the microcontroller 50 samples and digitizes the outputs from the amplifiers 53a, 53b, 53c and 53d (i.e., the output signals $V_a$, $V_b$, $V_c$ and $V_d$, respectively) and stores each digitized output in temporary storage of the microcontroller 50.

During a measurement operation the microcontrollers 50 and 51 establish a control sequence for making position measurements in response to data gathered from the analog-to-digital converter 57. As a reference, the microcontroller 50 generates a first square-wave ADC clocking signal with a frequency fref that obtains readings from the ADC 57. A set of fscale clocking signals are derived from the fref signal for controlling the frequency and phase of the output signals from the I/O module 52.

Two additional signals are derived from the fref clocking signals. These additional signals control the timing and the nature of the measurement operations. A normal-mode interrupt signal (INTn) initiates an analysis of the measurement data at a first repetition rate that frequency that provides visual persistence of the image on the display 23 in FIG. 1. A min/max mode initiates an analysis of the range of motion of the spindle 22 as would be used, for example, to define the limits of axial motion of a shaft during rotation by generating a min/max interrupt signal (INTmix/max) at a second repetition rate. For purposes of illustration, in one embodiment of this invention, the foregoing clocking frequencies and interruption rates are:

TABLE 3

| Signal | Frequency |
| --- | --- |
| fref | 200 kHz |
| fscale | 50 kHz |
| INTn | 10 Hz |
| INTmin/max | 1 kHz |

Other frequencies could be selected. In response to each of the foregoing interruptions, the system performs, in sequence, a "coarse" measurement, a "fine" measurement and a second "coarse" measurement to provide an accurate measurement of displacement of the spindle 22 in FIG. 1.

Coarse Measurement

During a "coarse" measurement process, the scale 32 is functionally divided into four "quadrants" of eight contiguous scale bars each, and the reader 34 processes signals from all of the reader segments R1 through R16. In this embodiment the coarse measurement process determines the position of the reader 34 to within one scale bar. Coarse measurements thereby define the position of the reader 34 within a narrow band. Processing the data with a sequence of a coarse measurement, a fine measurement and another coarse measurement determines spindle position with maximum accuracy (e.g., 0.0001 inches). Moreover, a measurement device as described in the disclosed embodiment produces measurement operations at two different rates (e.g., 10 Hz and 10 kHz). Each analysis requires given processing time. During rapid motion of the reader 34 past the scale 32, it is possible for the first and second coarse measurements to define different scale bar positions. In accordance with one aspect of this invention, the "coarse" measurements are helpful in providing an approximate position which, in such a dynamic situation, allows the dial indicator to track the reader position without the time required to process a "fine" measurement.

Figure 9:
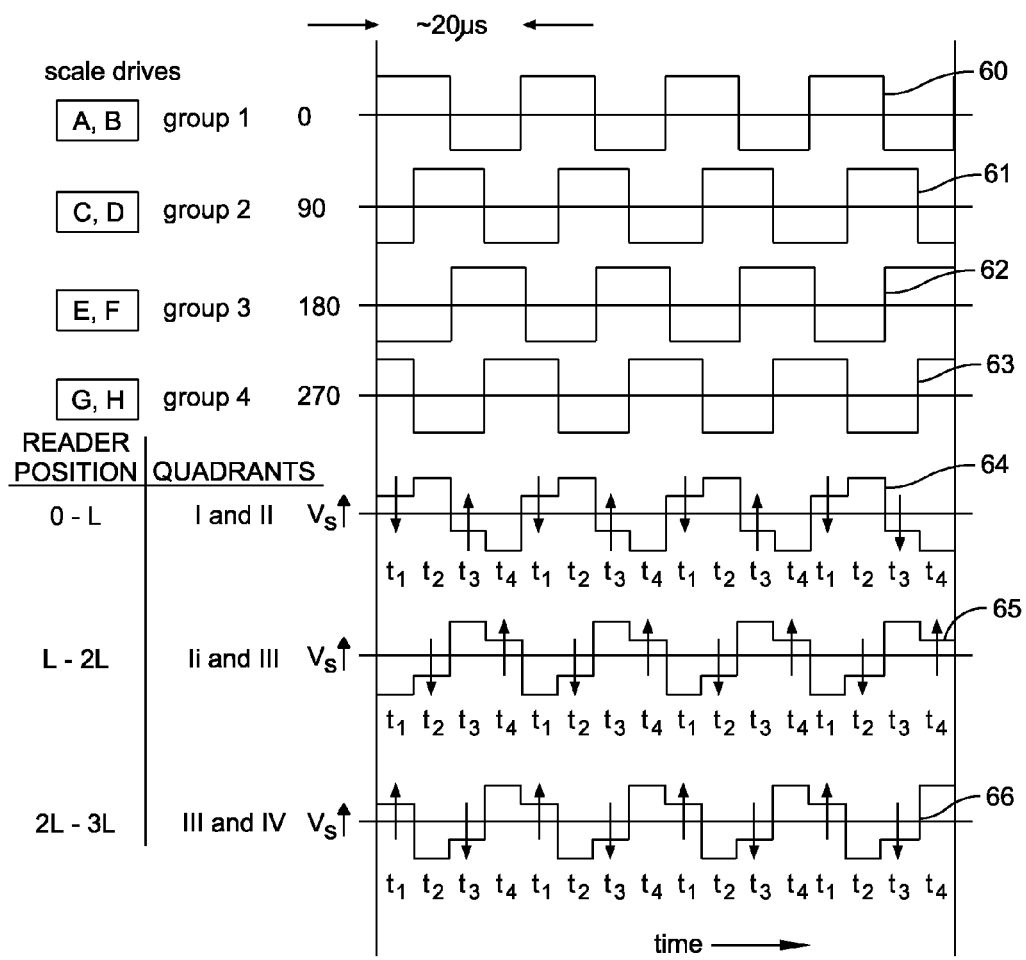
FIG. 9 is a graphical analysis that depicts signals that are useful in making measurements during with a first operational mode and signal levels that generated during the first operational mode as a function of relative displacement between the scale and reader.

Still referring to FIG. 5 during a coarse measurement, the input/output control 52 produces four square waves each with a 90° phase shift with respect to the adjacent square waves, such as square waves 60 through 63 in FIG. 9. That is, the square waves 61 through 63 have phase shifts relative to the square wave 60 of 90°, 180°, and 270° respectively. Stated differently, each square wave in a set has a 90°, 180°, 270° or 360° phase shift that stands for delays of one-quarter (¼), one-half (½), three-quarters (¾)_ and one (1) period length of the square-wave signal. Referring to FIGS. 5 and 9 and Table 3 above, square waves 60 through 63 connect to the scale bars so that square wave 60 energizes all of scale bars B1 through B8 of Quadrant I. Likewise square wave 61 energizes scale bars B9 through B16 of Quadrant II. Square waves 62 and 63 are applied to the scale bars B18 through B24 (Quadrant III) and B25 through B32 (Quadrant IV) respectively. Stated differently, during a coarse measurement, the scale bars B1 through B8 are energized by one square wave. If the reader 34 is positioned to overlap the scale bars of Quadrant I, the scale bars act as a single scale electrode having the extent of all the reader bars R1 through R16. At this position, the reader 34 is co-extensive with Quadrant I and the reader output signals are processed to generate a summed signal, $V_s$, which varies with time t and wherein:

$$V_S(t) = V_a(t) + V_b(t) + V_c(t) + V_d(t), \quad (1)$$

where $V_a(t)$, $V_b(t)$, $V_c(t)$, and $V_d(t)$ represent the amplifier output signals shown in FIG. 5.

In this reader position, $V_a(t)$, $V_b(t)$, $V_c(t)$, and $V_d(t)$ are energized by the signal 60 in FIG. 9. As the reader 34 moves to a position at which the reader bars overlap adjacent scale bars in both Quadrants I and II, $V_s$ will depend on the signals from the scale bars of Quadrant I and the signals from the scale bars of Quadrant II which are displaced in phase by 90°. There is no contribution from the scale bars in Quadrants III and IV. As the reader continues to move into Quadrant III, the value of $V_s$ becomes dependent upon the signals that received by reader bars in Quadrants II and III. This pattern continues to provide variations in $V_s$ with further motion as the reader moves from Quadrant III to Quadrant IV.

Still referring to FIG. 9, collectively the square waves define four time intervals "$t_1$", "$t_2$", "$t_3$", and "$t_4$" bounded by the transitions of the square waves 60 through 63. When the reader 34 is in Quadrant I, the $V_s$ samples are measured at the mid-points of timing intervals "$t_1$" and "$t_3$" while during intervals "$t_2$" and "$t_4$", the corresponding outputs $V_s(t_2)$ and $V_s(t_4)$ are at maximum and minimum reference values. As the reader 34 moves into Quadrant II, the sum $V_s$ becomes increasingly dependent upon the signals received from scale bars in Quadrant II. During the "$t_1$" interval, the value $V_s(t_1)$ of the graph 64 therefore decreases and during the "$t_3$" interval the value $V_s(t_3)$ increases as shown by the arrows. When the reader 34 is moving into the area coextensive with Quadrant II and Quadrant III, graph 65 illustrates the resultant signal with fixed reference signals $V_s(t_1)$ and $V_s(t_3)$ at time intervals "$t_1$" and "$t_3$", respectively, and oppositely shifting values $V_s(t_2)$ and $V_s(t_4)$ at time intervals "$t_2$" and "$t_4$". Graph 66 is based on the input signal 62 and 63 when the reader 34 is moving into the area coextensive with Quadrant III and Quadrant IV.

Figure 10:
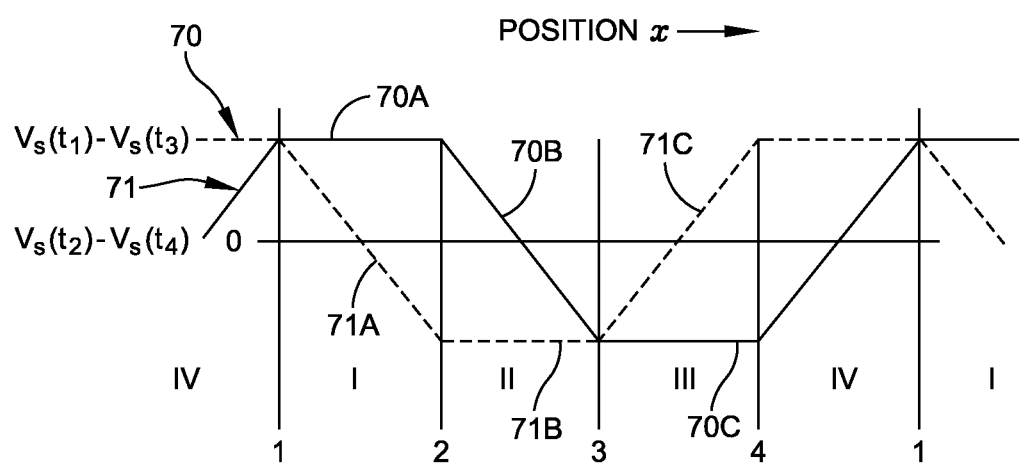
FIG. 10 is a graph that depicts the relationship between the output signals and measured position during the first operational mode.

From FIG. 9 it will also be apparent that $V_s(t_1) = -V_s(t_3)$ and $V_s(t_2) = -V_s(t_4)$. FIG. 10 depicts two graphs 70 and 71 that represent the demodulated values $V_s(t_1) - V_s(t_3)$ and $V_s(t_2) - V_s(t_4)$ of the signals shown in graphs 64 through 66 in FIG. 9 as the reader 34 moves through its range of travel. Graph 70 depicts the range of signal values $V_s(t_2) - V_s(t_4)$ derived during the "$t_2$" and "$t_4$" intervals of the graphs 64 and 66; graph 71 represents the range of signal values $V_s(t_1) - V_s(t_3)$ derived during the "$t_1$" and "$t_3$" interval as shown in the graphs 65. As the reader 34 moves from Quadrant I to Quadrant II, a corresponding portion 70A of the signal of graph 70 is at a constant positive maximum. At the same time, the signal of graph 71A moves from a maximum positive value to a maximum negative value. During the transfer from Quadrant II to Quadrant III, the portion 70B shifts from a positive maximum to a negative maximum while the graph 71B depicts the value $V_s$ at a negative minimum value. As the reader 34 moves from Quadrant III to Quadrant IV, the signal 70C remains at a maximum negative value while the signal 71C shifts from a maximum negative value to a maximum positive value.

The combination of these signals in FIG. 10 defines a non-ambiguous position of the reader 34 with respect to the various quadrants or scale groups. Specifically, assume that "$(V_s(t_2) - V_s(t_4))$" represents the signals for graph 70 and "$(V_s(t_1) - V_s(t_3))$" represents the signals of graph 71. A two-step analysis generates the position of the reader 34 at a specific scale bar. The first step is to obtain a coarse position of the reader 34 with respect to the scale 32. This is accomplished by first identifying the quadrant or quadrants that are coextensive with the reader. The magnitudes of $(V_s(t_2) - V_s(t_4))$ and $(V_s(t_1) - V_s(t_3))$ are processed according to the following table:

TABLE 4

| Test 1 | Test 2 | Reader over Quadrants |
|---|---|---|
| $(V_s(t_2) - V_s(t_4)) > (V_s(t_1) - V_s(t_3))$ | $\|V_s(t_2) - V_s(t_4)\| > \|V_s(t_1) - V_s(t_3)\|$ | I and II |
| $(V_s(t_2) - V_s(t_4)) > (V_s(t_1) - V_s(t_3))$ | $\|V_s(t_2) - V_s(t_4)\| < \|V_s(t_1) - V_s(t_3)\|$ | II and III |
| $(V_s(t_2) - V_s(t_4)) < (V_s(t_1) - V_s(t_3))$ | $\|V_s(t_2) - V_s(t_4)\| > \|V_s(t_1) - V_s(t_3)\|$ | III and IV |

Between Quadrants I and II, the basic form for a coarse measurement is:

$$x_{coarse} = \frac{L}{2}\left[1 - \frac{V_s(t_1) - V_s(t_3)}{V_s(t_2) - V_s(t_4)}\right] \quad (2)$$

where L is the effective length of a single group of reader bars so the total length of travel is 3L. Table 5 depicts the calculations that provide the coarse position measurement, $x_{coarse}$ an accuracy of at least the width of one scale bar.

TABLE 5

| QUADRANT | MEASUREMENT | |
|---|---|---|
| I-II | $x_{coarse} = \frac{L}{2}\left[1 - \frac{V_s(t_1) - V_s(t_3)}{V_s(t_2) - V_s(t_4)}\right]$ | (3) |
| II_III | $x_{coarse} = L + \frac{L}{2}\left[1 + \frac{V_s(t_2) - V_s(t_4)}{V_s(t_1) - V_s(t_3)}\right]$ | (4) |
| III-IV | $x_{coarse} = 2L + \frac{L}{2}\left[1 - \frac{V_s(t_1) - V_s(t_3)}{V_s(t_2) - V_s(t_4)}\right]$ | (5) |

As an alternative, the equations (3), (4) and (5) can slightly be simplified by applying the relationship of $V_s(t_1) = -V_s(t_3)$ and $V_s(t_2) = -V_s(t_4)$, which also allows to reduce the measurement of the four voltages $V_s(t_1)$, $V_s(t_3)$, $V_s(t_2)$, and $V_s(t_4)$ to measuring only two of them, for instance $V_s(t_1)$ and $V_s(t_2)$ or $V_s(t_3)$ and $V_s(t_4)$. Upon completion of the calculation the "coarse" position "$x_{coarse}$" accuracy is enhanced by adding a "fine" measurement.

Fine Measurement Configuration

Figure 11:
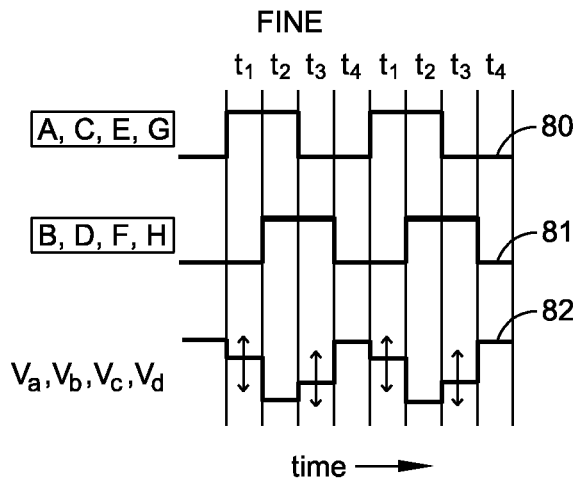
FIG. 11 is a graphical analysis of various signals that are generated during a second operational mode.

Referring to FIGS. 5 and 11, during a "fine" measurement, the I/O module 52 routes a first square wave 80 to output terminals A, C, E and G of the I/O module 52 as shown in FIG. 5. A second square wave 81 shifted in phase by 90° from the first square wave 80 energizes terminals B, D, F and H. Stated differently, for a square-wave signal, a phase shift of 90° stands for a delay of one-quarter (¼) period length of that square-wave signal. In a specific embodiment, the square wave 80 at terminals A, C, E and G are applied to the odd-numbered scale bars (i.e., the scale bars B1, B3, . . . B31); the 90° phase shifted square wave 81 at output terminals B, D, F and G to the even-numbered scale bars (i.e., B2, B4, . . . B32). Thus, a square wave of a given frequency and phase energizes the odd-numbered scale bars while a square wave of the same given frequency but shifted in phase by 90° energizes the even-numbered scale bars. As previously described, the reader bars have a pitch that is one half the pitch of the scale bars. So it appears that there are two sets of scale-bar-width reader bars with the two sets being displaced by one-half of a scale bar along the measurement axis as defined by the dashed line in FIG. 2.

FIG. 11 depicts two cycles of the first square wave 80 from the input-output module generated at terminals A, C, E and G with each cycle being divided into four timing intervals $t_1$ through $t_4$. The second square wave 81 has a 90° phase shift and therefore is shifted by one timing interval. Graph 82 depicts the general form of the outputs from the amplifiers 53 in FIG. 5.

The amplifiers 53 in FIG. 5 provide voltage signals to the analog-to-digital converter 57 in microcontroller 50 to obtain a measurement in digital format. During time intervals $t_2$ and $t_4$ the signals depicted with graphs 80 and 81 are constant, so that also the amplifier output voltages $V_a(t)$, $V_b(t)$, $V_c(t)$, and $V_d(t)$ are constant and do not vary as a function of the relative position of the reader bars and the scale bars and thus during time intervals $t_2$ and $t_4$, voltages $V_a(t)$, $V_b(t)$, $V_c(t)$, and $V_d(t)$ are independent of motion of reader 34. During timing intervals $t_1$ and $t_3$ the voltages $V_a(t)$, $V_b(t)$, $V_c(t)$, and $V_d(t)$ are position-dependent and vary as a function of the relative position of the reader bars and the scale bars. This relationship exists because the capacitance between a given scale bar and an overlapping reader bar varies as the reader 34 moves relative to the scale 32 thereby changing the effective area of the electrodes. The position-dependent voltage is, however, sensitive to gap as well as position; this sensitivity is removed by later calculating the corrected position as a percentage of the reference signal measured at $t_2$ and $t_4$.

Figure 12:
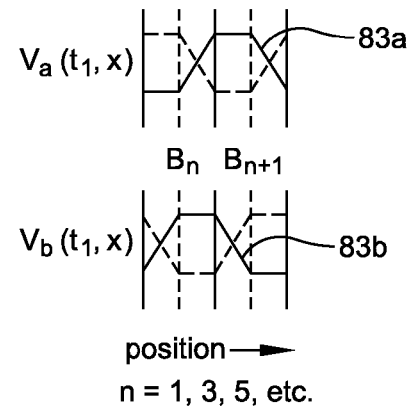
FIG. 12 graphically depicts the relationship of certain reader signals as a function of reader position.

The graph 82 in FIG. 11 shows the variation of the levels in the $V_a(t)$, $V_b(t)$, $V_c(t)$, and $V_d(t)$ signals as a function of position during the $t_1$ and $t_3$ time intervals. For further consideration of the dependence of these voltages on the reader position x, the output voltage at a specific time interval, for instance $t_1$, is denoted as $V(t_1, x)$. FIG. 12 depicts the signal levels for $V_a(t_1, x)$ and $V_a(t_1, x)$ during $t_1$ as a function of reader position x over the range of two scale bars as, for example, during the position interval when the R1 and R2 electrodes pass a single scale bar thereby generating the output voltages $V_a(t_1, x)$ and $V_b(t_1, x)$ signal. If a single reader bar R1 moves past a given scale bar over a distance corresponding to the reader pitch without overlapping a neighboring scale bar, the resulting signal 83a for $V_a(t_1, x)$ remains at a constant value, while the signal 83b of an adjacent reader bar R2 partly overlaps the same scale bar and partly a neighboring one, so that the corresponding output voltage $V_a(t_1, x)$ linearly changes with position x, which in FIG. 12 is shown as a ramp to a positive voltage. When continuing the displacement, the voltage $V_a(t_1, x)$ will linearly change, while the voltage $V_a(t_1, x)$ remains constant. Thus, as will be apparent, the $V_a(t_1, x)$ and $V_a(t_1, x)$ signals follow the same path, except for a position shift in the x-direction that corresponds to one-half of a scale bar.

In addition, the graphs of $V_a(t_1, x)$ and $V_a(t_1, x)$ versus position x are inverted versions of $V_a(t_1, x)$ and $V_a(t_1, x)$. Similarly, for time interval $t_3$, the graphs of $V_c(t_3, x)$ and $V_d(t_3, x)$ versus position x are inverted versions of $V_a(t_3, x)$ and $V_b(t_3, x)$ respectively or—stated otherwise—are shifted over a position distance, corresponding to 1 bar position. Similarly, the graph of $V_d(t_3, x)$ versus position x is shifted from $V_b(t_3, x)$ by 1 bar position.

Electronic circuits for implementing this invention are subject to common-sign errors like offsets and low frequency noise. In accordance with one implementation of this invention, sampled values each of the $V_a(t, x)$ and $V_b(t, x)$ signals from the amplifiers 53a and 53b are processed to obtain a quotient value $Q_a(x)$ by subtracting the output voltage at each time interval at the $t_3$ interval from that output voltage obtained during the $t_1$ interval and those during the $t_4$ interval from those during the $t_2$ interval and then dividing the differences for amplifier 53a. For $Q_a(x)$:

$$Q_a(x) = \frac{V_a(t_1, x^i) - V_a(t_3, x^{ii})}{V_a(t_2, x^{iii}) - V_a(t_4, x^{iv})} \quad (6)$$

The superscripts for x indicate that, for a fast moving reader 34, the position x can have been changed during sampling of the four voltages. However, usually sampling can be performed at a sufficiently high sampling rate that such changes in position x can be neglected and Equation (6) can be approximated as $$Q_a(x) = \frac{V_a(t_1, x) - V_a(t_3, x)}{V_a(t_2, x) - V_a(t_4, x)} \quad (7)$$

As is known, amplifiers such as amplifiers 53a through 53d are subject to gain tolerances and variations. Also small changes in the gap (i.e., the gap 48 in FIG. 7) between the scale 32 and reader 34 will change the gain. The division applied according to Equation (7) to each amplifier eliminates the effect of variations and tolerances of the gain. Corresponding quotients $Q_b(x)$, $Q_c(x)$ and $Q_d(x)$ are calculated for each of the other amplifiers 53b, 53c and 53d for the same group of samples.

Figure 13:
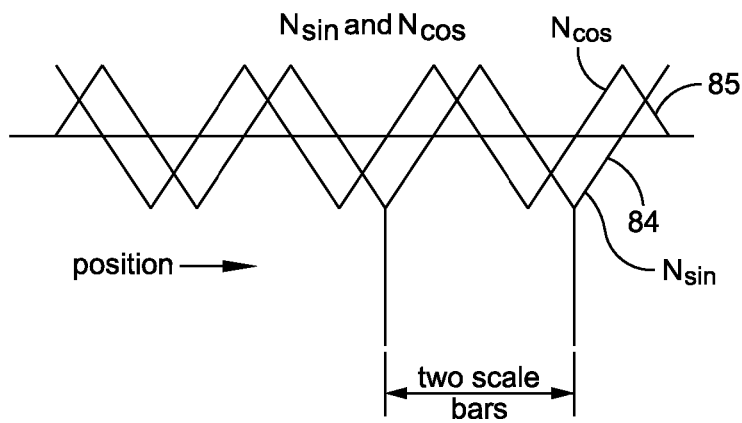
FIG. 13 graphically depicts the relationship of processed signals from a reader as a function of position.

Analyzing these quotients provides a so-called sine and cosine relationship that repeats every two scale bars as shown in FIG. 13. That is, over successive samples taken as the reader 34 advances, the above processing produces results that define two triangularly-shaped position-dependent functions $N_{sin}(x)$ and $N_{cos}(x)$ that have are shifted in position x over a distance of one-half a scale bar, which equals one reader bar, according to:

$$N_{sin}(x) = (Q_a(x) - Q_c(x)) - (Q_b(x) - Q_d(x)) \quad (8)$$

and $$N_{cos}(x) = (Q_a(x) - Q_c(x)) + (Q_b(x) - Q_d(x)). \quad (9)$$

Thus, during a position measurement, the coarse measurement uses a first analysis to determine the distance to a position scale bar that has a known distance from a reference position. For a dial indicator with a scale length 4L, each quadrant corresponds to L and each scale bar corresponds to L/8. The coarse measurement then identifies the corresponding scale bar and the distance to that scale bar which is rounded to the nearest integer. The fine measurement uses this value to define the distance from the beginning of the scale bar to the position calculated from a reference position, as when the spindle 22 is at its fully extended position.

Operation

Figure 14:
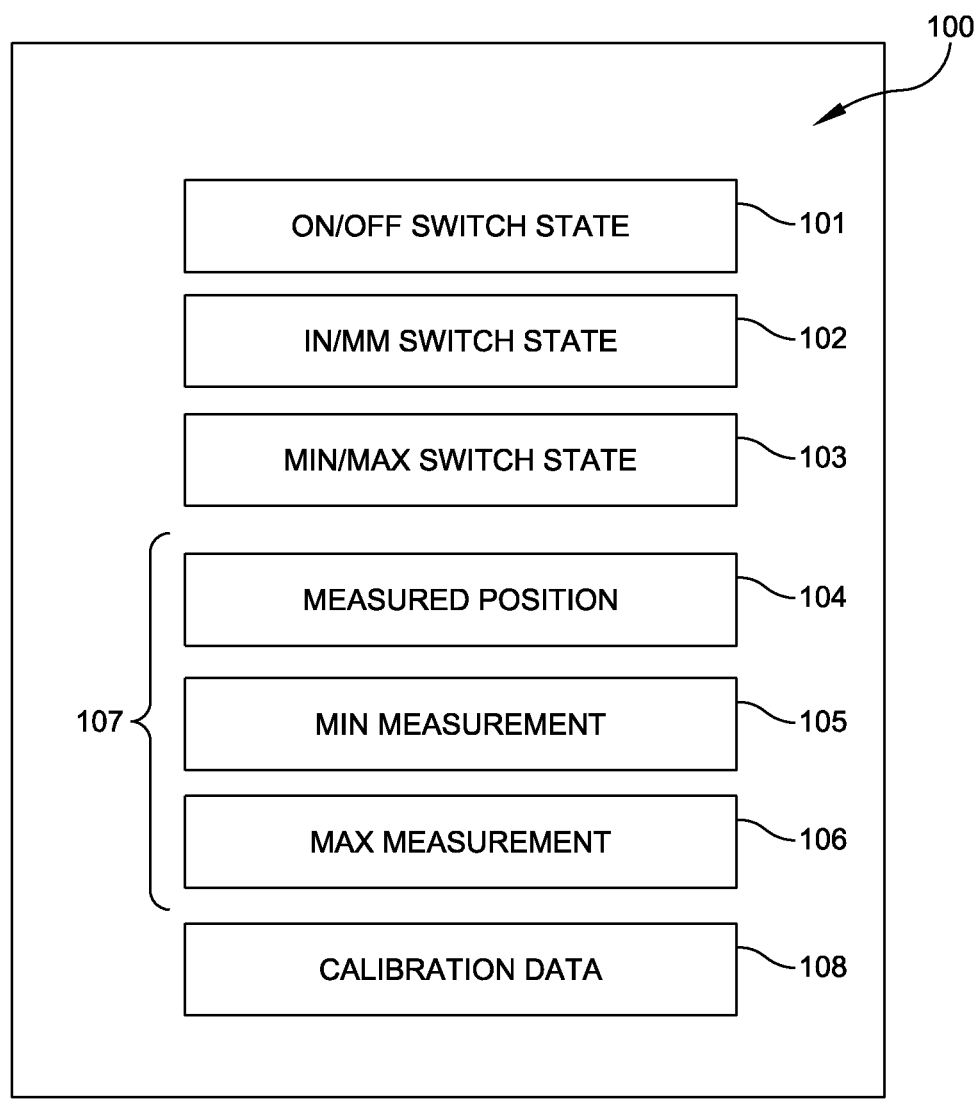
FIG. 14 depicts various control registers and data buffers that can be included in an embodiment of this invention.
Figure 15A:
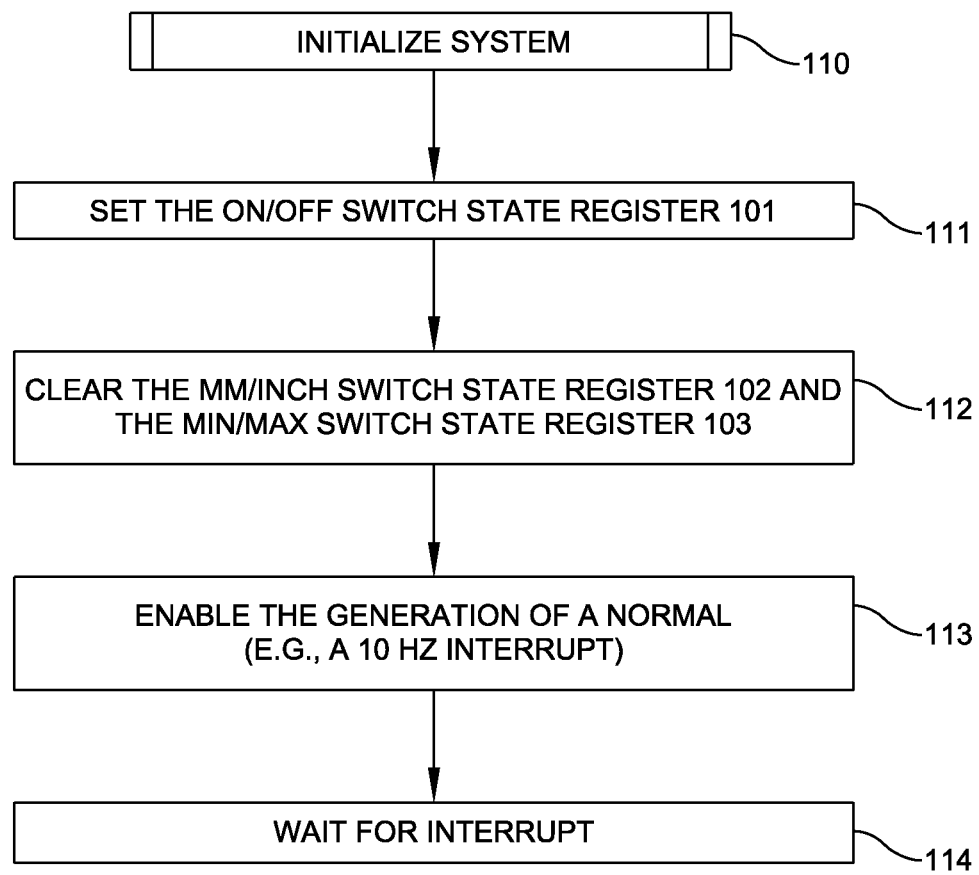
FIGS. 15A and 15B depict the operation of one embodiment of a dial indicator constructed in accordance with this invention.
Figure 15B:
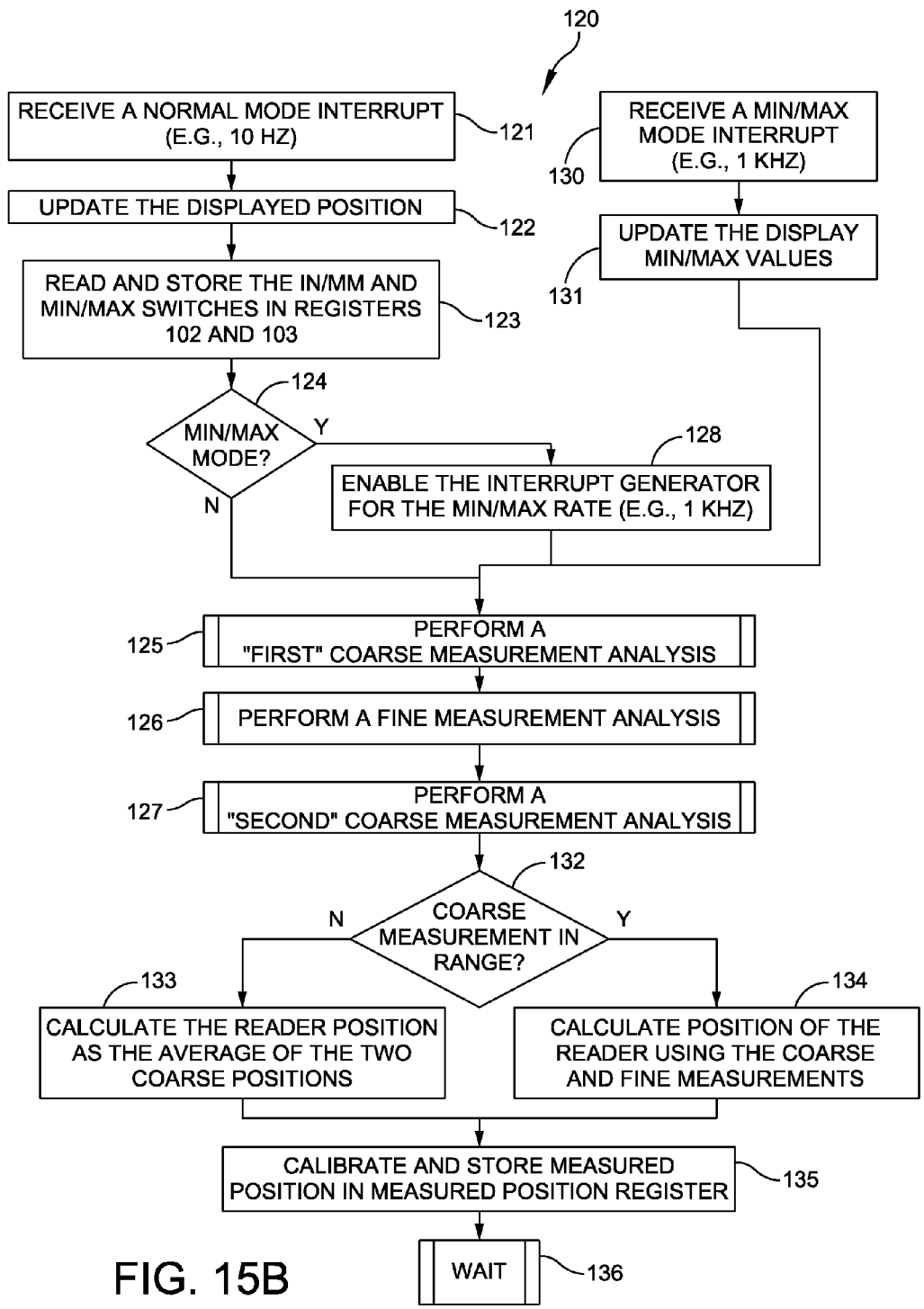

FIGS. 14, 15A and 15B depict structures and methods by which the controllers on circuit boards 37 and 40 in FIG. 5 (i.e., a "system control") collectively perform a number of functions to calculate a reader position and display that position information. More specifically, the process of obtaining a measurement of position and display includes a register set 100 in FIG. 14 that is located in the system control. The register set 100 includes an ON/OFF SWITCH STATE register 101. When an operator depresses the ON/OFF switch 29 in FIG. 1 to turn on the dial indicator, the "system control" applies power to various components of the system control, such as a clocking signal generator (not shown, but known in the art). Subsequent operation of the ON/OFF switch 29 turns off the power. The ON/OFF SWITCH STATE register 101 can be constituted as an independent register or as a fixed position flag in a single state register. Likewise, successive operation of the IN/MM switch 30 toggles the value in an IN/MM STATE register 102 whereby the system control presents the data in the display 23 either in a metric or U.S. standard format. In response to successive operation of the MIN/MAX switch 31, the system control updates the state in a MIN/MAX STATE register 103 to enable and disable the MIN/MAX operating mode.

Different memory locations store various measurements. FIG. 14 includes a MEASURED POSITION register 104, a MIN MEASUREMENT register 105 and a MAX MEASUREMENT register 106 as members of a register set 107. When an operator selects the MIN/MAX operating mode, the registers 105 and 106 store updated values in the minimum data value and maximum data value respectively as determined during each of successive measurements. If calibration is provided, the register set 100 will also include a calibration data store 108 for use as described later.

When an operator depresses the ON/OFF switch 29 of FIG. 1 to turn on the electronics, the system control responds by performing an initiation process 110 as shown in FIG. 15A. Step 111 sets the ON/OFF SWITCH STATE register 101. Step 112 clears the IN/MM SWITCH STATE register 102 and clears both the MIN MEASUREMENT register 105 and the MAX MEASUREMENT register 106. It is assumed that the system control initially establishes a normal interrupt mode that operates at a repetition rate that provides visual persistence of the display 23, such as a 10 Hz repetition rate.

The operation could be based upon a synchronous operation controlled by a system clock. However, in the embodiment shown in FIG. 15B, a system control 120 responds to interrupts thereby to extend battery life. During operation in the normal mode, the system control receives a normal interrupt (e.g., a 10 Hz interrupt) in step 121 of FIG. 15B and transfers control to step 122 to update the display 23 (FIG. 1) with data stored in the measured position register 107 of FIG. 14. Step 123 reads and stores the IN/MM switch state and the MIN/MAX switch state in registers 102 and 103 in FIG. 14.

During the initialization process 110, a first interrupt will be a "normal" interrupt so step 124 transfers control to step 125 that uses the previously described relationship as depicted in FIGS. 9 and 10 to obtain a first coarse measurement as described later. This first coarse measurement loads into a measurements buffer (not shown, but known in the art). Specifically, the first coarse measurement operates to obtain the $x_{coarse}$ dimension. That dimension can then be divided by the scale bar pitch to obtain the scale bar number and the relative location in the identified scale bar.

If, prior to receiving an initial normal interrupt the operator has depressed the MIN/MAX switch 31, step 124 transfers control to step 128 that enables the interrupt generator to run with a higher interrupt rate. In one embodiment the MIN/MAX interrupt rate is 1 kHz. Step 128 then transfers to step 125 to begin an analysis.

When the interrupt generated in response to the enablement by step 128 is received at step 130, control transfers to step 131 that updates the displayed MIN/MAX values at the display 23. Upon completion of the step 124 or step 128 or step 131, system control transfers to the measurement analysis beginning at the first coarse measurement analysis 125. After completing the both the coarse and fine measurement analyses 125 and 126, the system control stores the measurements in the previously described measurement buffer. A second coarse measurement process 127 then recalculates the coarse position and stores this second coarse position in the previously described measurements buffer.

Referring to FIG. 9, the system control initiates the measurement analyses by driving the scale bars with different ones of the square waves 60 through 63. The first pattern 60 from the input/output module 52 in FIG. 5 drives the scale bars B1 through B8. Thus, the corresponding scale bars are driven in parallel and effectively form a single scale bar corresponding to Quadrant I for measurement purposes. Similarly, the square wave 61 drives Quadrant II scale bars B9 though B16; square wave 62, scale bars B17 through B24 in Quadrant III; square wave 62, the Quadrant IV scale bars B17 through B24; square wave 63, the Quadrant IV scale bars B25 through B32.

As previously described, these signals are capacitively coupled to adjacent reader bars and are processed to obtain the $x_{coarse}$ value which is converted into a normalized value by dividing its value by the scale-bar pitch $x_{pitch}$, to identify a specific scale bar (e.g., scale bar B17).

During the fine measurement processing of step 126, and as previously described, the scale-bar-driving signal pattern changes so that each scale bar is driven by one of two square waves, such as the square waves 80 and 81 in FIG. 11. As shown in FIGS. 11 through 13, the $N_{sin}(x)$ and $N_{cos}(x)$ signals have a cycle that corresponds to two scale bars. The process calculates the distance to the measured location as the percentage of the scale bar pitch. Then the measured distance is obtained by summing (1) the distance from an origin to the beginning of the B17 scale bar without the percentage obtained during the coarse measurement and (2) the percentage of distance from the beginning of the B17 scale bar to the point of the measurement in the fine measurement process. For example, in the foregoing example, if $x_{coarse}/x_{pitch}=17.3824$ and the normalized fine measurement is 0.4023, the final measurement rounds the coarse measurement to 17.0000 and adds the fine measurement of 0.4023 and will identify a location that is 17.4023 in scale bar units. Multiplying this number by the scale-bar pitch $x_{pitch}$ results in a location specified in inches or mm. Subtracting the position of a stored zero reference shows the user the difference between measured location and any stored zero reference.

Referring again to FIG. 15B, step 132 determines whether the measurements produced during the first and second coarse measurement processes 125 and 127 are within a specified range. If, during each iteration of the process in FIG. 15B, the velocity at which the reader 34 in FIG. 5 passes the scale 32 exceeds a value such that complete processing cannot be completed between successive interrupts, the location cannot be calculated. If the successive coarse measurements obtained during an interrupt response differ by more than a specific value (e.g., more than a single scale bar), step 132 transfers control to step 133 that calculates a reader position as the average of the two coarse positions that were stored in the measurement buffer. This position is stored in the measured position register 104 of FIG. 14. Otherwise, step 132 transfers control to step 134 that calculates the position based upon the information obtained by processes 125, 126 and 127. After the measurement value has been updated by either step 133 or 134, the system control uses step 135 to calibrate and store the measurement in the measured position buffer 104 and then enters a "wait" state 136 until a next interrupt signal is received at either step 121 or step 130.

It will now be apparent that a dial indicator incorporating this invention generates both coarse and fine measurements during each iteration of the method of FIG. 15B. If the spindle rod 22 in FIG. 1 moves at an excessively high rate so that the processing is not completed in a timely fashion, the coarse measurement values serve to provide information from which the reader position can be determined. This feature enables the system to perform faster, albeit less accurate, calculations as may occur during steps 133 or 134 as are acceptable during rapid motion.

Figure 16A:
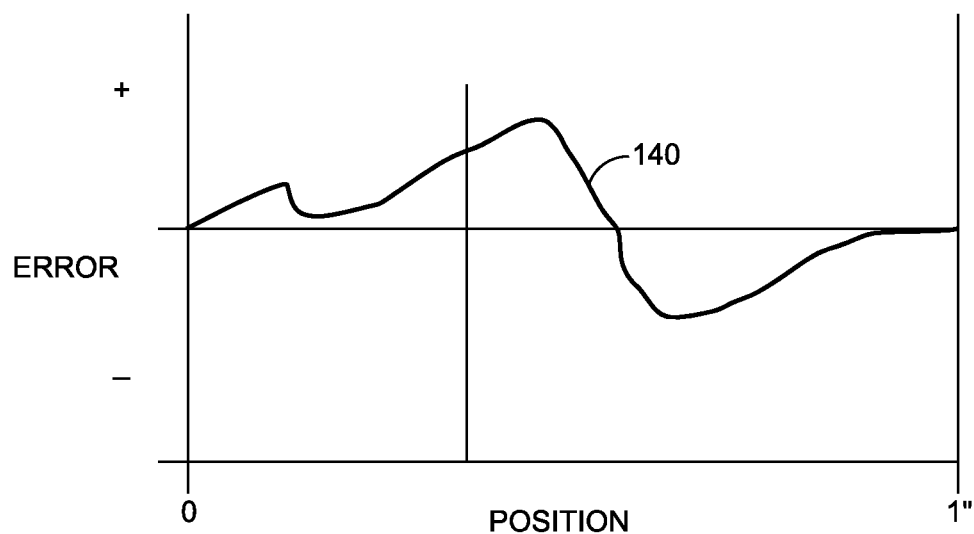
FIG. 16A graphically depicts calibration data of measured error as a function of actual position and FIG. 16B depict a process for calibrating measured data to obtain a calibrated position measurement.
Figure 16B:
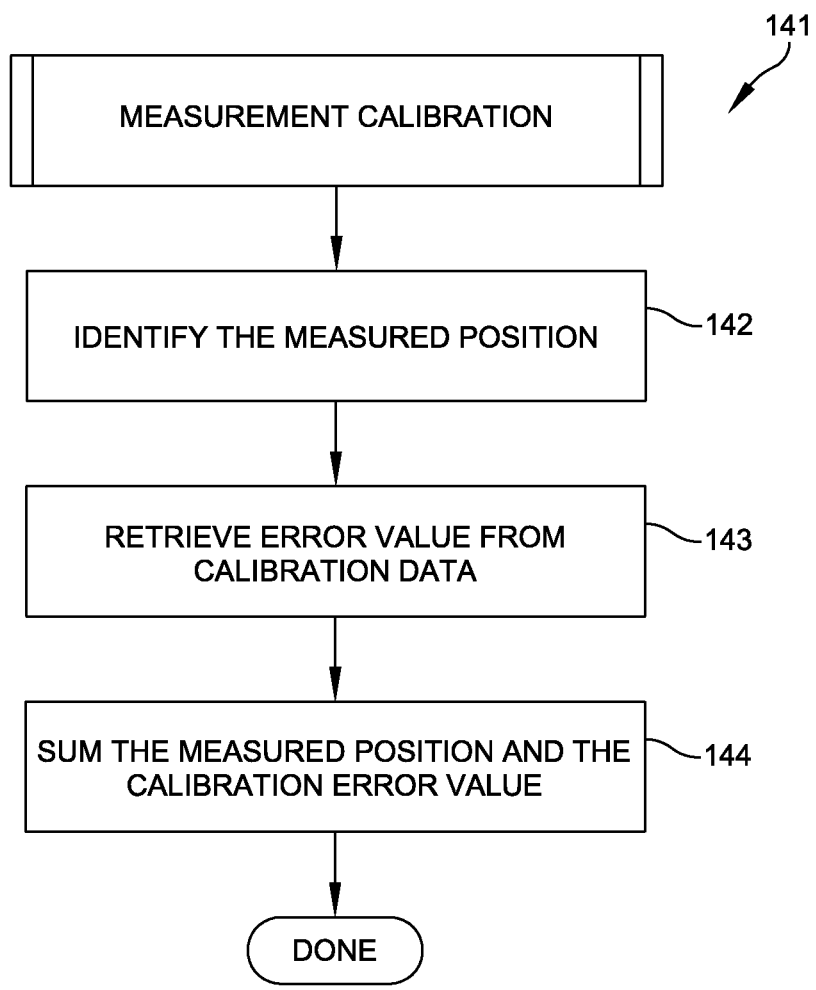

Maximum accuracy occurs if the calibration process of step 135 in FIG. 15B is implemented. As one of the final steps, an assembled dial indicator 20 is operated by moving the reader 34 from one end to the other while recording the measured values and the actual position. The errors for each measurement are stored. FIG. 16A depicts a resulting calibration curve 140 which plots error as a function of position. When a dial indicator is in use, an included measurement calibration function processes the measured data in step 135 of FIG. 15B. After the dial indicator 20 in FIG. 1 completes with step 133 or 134, control transfers to the measurement calibration process 141 in FIG. 16B, Step 142 identifies the location of the uncalibrated measurement. Step 143 then retrieves the corresponding error value from the calibration data. Summing the uncalibrated measurement and the corresponding error in step 144 then provides a calibrated measurement that is stored in the measured position register 104 in FIG. 14. With this calibration, the process of combining the coarse and the fine measurements results in a measurement accuracy of better than 0.0001" over 1" of travel with a scale bar having a scale bar pitch of 0.062" and a reader bar pitch of 0.031".

The structure of this invention provides flexibility in position computation by eliminating as many errors as possible, particularly errors due to roll, pitch and yaw of the reader 34 with respect to the scale 32. Fine and coarse measurements, as can be seen from FIGS. 5, 6 and 7, are symmetric about a center line, along which the reader 34 moves. Any tendency of the reader 34 to roll about the center line will produce the same multiplicative deviation of all capacitors between the reader segments and the scale bars. Moreover, as the position X is found as a result of the ratio of voltages, which are proportional to the capacitors, a common multiplicative change in the capacitor values, a gap change or a power supply voltage change does not influence the result of the calculation.

If the device tends to be subject to tilt, such that one end of the reader board 34 is lower than the other, the resulting pitch error tends to have little effect on the measurement averages over the entire reader board. Moreover, the reader measures a relatively short distance along the scale for coarse position. Yaw errors can be handled by calibration and by providing a sufficient dead band between active electrodes.

For any given sensor, various tolerances can lead to errors. However, dial indicator embodying this invention is readily calibrated. One calibration method involves scale-bar-period effects. During a fine position, or during a fine computation, the actual signals do not have the triangular shape of FIG. 13. In practice the signals will be rounded triangles. One approach to resolving this issue is to calibrate a single unit and store its scale-bar-pitch calibration curve in all units. Each fine position reading can then be adjusted with its corresponding entry in a table.

A more accurate method that requires more memory combines fine and coarse calibration with a production calibration process. Each indicator is run through its entire range in an accurate calibration jig in final test. A resulting error curve is stored in the control system. It is not necessary to stop motion of the spindle rod to take a measurement. The position can slowly and continuously move along the range of motion by a positioner that uses a precise optical scale. Reading the information from the optical scale and the dial indicator provides an accurate calibration.

Another approach is to use only the coarse measurements. However, the analog circuits used in such a process are, over time, subject to drift beyond an accuracy of one scale bar. Measurements can be made at different positions along the range of motion of the reader and the differences can be stored as a coarse calibration error curve. Still another component of calibration can measure the impact of temperature variations. This can also be stored in memory to improve both mechanical and electronic temperature coefficient errors.

In summary, a dial indicator constructed in accordance with this invention utilizes capacitive sensing for generating accurate displacement measurements and provides absolute and relative displacement position information. Such a dial indicator enables and facilitates measurement calibration.

It will be apparent that there are many variations that can be made to the disclosed dial indicator without departing from the spirit and scope of this invention. The invention is disclosed with connection with a specific mechanical structure of FIGS. 1 through 5. Different components and configurations could be substituted. The number of scale bar electrodes and reader bars can be varied. Different electronic circuits and control systems could be substituted. Different implementations of the processes for controlling the system and for calculating the various fine and coarse positions can also be modified. Therefore it is the intent of the appended claims to cover each such variation as comes within the spirit and scope of this invention.

What is claimed is:

1. A linear measurement system, comprising:
   a scale comprising a first plurality of scale bars extending along a measurement axis for a coarse position measurement and a fine position measurement;
   a scale bar energizer configured to energize the scale bars;
   a reader comprising a second plurality, less than the first plurality, of reader bars extending along the measurement axis;
   the reader moveable relative to the scale along the measurement axis whereby each of said reader bars is capacitively coupled to different ones of said scale bars;
   a controller responsive to a plurality of capacitively coupled signals from said reader bars resulting from a capacitive coupling of the reader bars to a plurality of the first plurality of scale bars for generating the coarse position measurement, the fine position measurement, and a measured position based on the coarse and fine measurements;
   the energizer is configured to provide the plurality of scale bars with a plurality of scale signals such that the plurality of capacitively coupled signals read by the reader are a unique set of signals for each position of the reader relative to the scale when in a coarse position measurement mode; and,
   a display for displaying the measured position.

2. The linear measurement system as recited in claim 1, wherein said reader bars have a reader bar pitch, and said scale bars comprise a scale bar pitch, said scale bar pitch is an integer multiple of said reader bar pitch.

3. The linear measurement system as recited in claim 2, wherein the scale bar pitch is twice the reader bar pitch.

4. The linear measurement system as recited in claim 3, wherein said scale bars are a plurality of groups and each group has a like plurality of scale bars.

5. The linear measurement system as recited in claim 4, wherein said plurality of reader bars extend along the measurement axis for a distance equal to an extent of a group of scale bars.

6. The linear measurement system as recited in claim 5, wherein said reader supports a plurality of amplifiers and wherein each amplifier sums the plurality of capacitively coupled signals from selected ones of said reader bars to generate a plurality of phase-shifted analog signals, said controller being responsive to the signals from said amplifiers.

7. The linear measurement system as recited in claim 6, wherein said first plurality of scale bars of the scale comprises thirty-two scale bars and said second plurality of reader bars comprises sixteen reader bars, and the scale comprises four amplifiers, each amplifier summing the signals from different sets of reader bars.

8. The linear measurement system as recited in claim 7, wherein said controller comprises an analog-to-digital converter that samples a converter output of the converter to obtain a series of digital representations of outputs from the amplifiers for processing to obtain a position measurement.

9. The linear measurement system as recited in claim 8, wherein said controller is configured to generate the coarse position measurement that identifies the position of a scale bar of the first plurality of scale bars.

10. The linear measurement system as recited in claim 9, wherein said scale bar energizer is configured to generates a plurality of clocking signals of a given frequency and of different phases, and the scale bar energizer is configured to apply the clocking signals of a given phase to a group of contiguous scale bars of the first plurality of scale bars, the plurality of scale signals are the clocking signals.

11. The linear measurement system as recited in claim 10, wherein said scale bars are grouped into four quadrants, said scale bar energizer is configured to generate clocking signals of a given frequency and a given one of a plurality of phases to said scale bars in a given quadrant whereby said controller responds to said signals from said reader by generating the coarse position measurement, the plurality of scale signals are the clocking signals.

12. The linear measurement system as recited in claim 11, wherein the controller is configured to generated the coarse position measurement with an accuracy of about one scale bar of the first plurality of scale bars.

13. The linear measurement system as recited in claim 8, wherein the controller is configured to generate the fine position measurement that identifies a location along a scale bar of the first plurality of scale bars.

14. The linear measurement system as recited in claim 13, wherein the controller is configured to generate the fine position measurement that identifies the position as a fraction of a scale bar pitch of a scale bar of the first plurality of scale bars.

15. The linear measurement system as recited in claim 14, wherein said scale bar energizer is configured to generate first and second phase-shifted clocking signals of a given frequency for energizing said scale bars in parallel when in a fine position measurement mode.

16. The linear measurement system as recited in claim 15, wherein the controller responds to the signals from said reader to determine the fine position measurement, which is a fraction of the scale bar pitch.

17. The linear measurement system as recited in claim 8, wherein the coarse position measurement is a first coarse position measurement, and the controller comprises an interruption function for initiating operation of the controller to obtain a first coarse position measurement, the fine position measurement, and a second coarse position measurement as initial position measurements and a function for determining a difference in a first position obtained by the first coarse position measurement and a second position obtained by the second coarse position measurement.

18. The linear measurement system as recited in claim 17, wherein if the difference between the first and second coarse position measurements is within a predetermined range, the controller accepts the position obtained from said first coarse position measurement and the fine position measurements; and if the difference is greater than the predetermined range, the controller accepts an average of the first position and the second position obtained during the first and second coarse position measurements.

19. The linear measurement system as recited in claim 18, wherein the controller comprises a calibration function for processing the accepted measurement, said calibration function comprising a stored calibration data that defines any errors between an actual distance and the distance measurement determined in response to the coarse and fine position measurements, the calibrating function is configured to alter the accepted measurement by an error value of the stored calibration data.

20. The linear measurement system as recited in claim 1, the controller comprises a mode selection function for selecting a first operating mode or a second operating mode requiring different repetition rates and wherein an interruption function responds to the selected first or second operating mode for generating interruptions at different repetition rates.

21. The linear measurement system as recited in claim 20, wherein an item to be measured undergoes linear displacement along the measurement axis, said repetition rate for said first operating mode being selected to produce a visually persistent display and said repetition rate for said second operating mode being selected to record minimum and maximum positions of said spindle at a greater repetition rate.

22. A linear measurement system, comprising:
a scale comprising a plurality of scale bars extending along a measurement axis for a coarse position measurement and a fine position measurement;
an energizer configured to energize the plurality of scale bars with a plurality of scale signals;
a reader comprising a plurality of reader bars extending along the measurement axis, the plurality of reader bars is less than the plurality of scale bars;
the reader moveable relative to the scale along the measurement axis to capacitive couple the plurality of reader bars to a plurality of the plurality of scale bars;
a controller configured to generate the coarse position measurement, the fine position measurement, and a final position based on a plurality of read signals, the plurality of read signals resulting from capacitively coupling the reader bars to a plurality of the plurality of scale bars, the plurality of read signals read by the reader are a unique set of signals for each position of the reader relative to the scale when the controller is operating in a coarse position measurement mode; and,
a display for displaying the final position.

23. The system of claim 22, wherein the energizer is the controller.

24. The system of claim 22, wherein the energizer generates a plurality of constant-frequency, phase-shifted square waves for delivery to the plurality of scale bars to energize the plurality of scale bars, the plurality of signals are the plurality of constant-frequency, phase-shifted square waves.

25. The system of claim 24, wherein the plurality of constant-frequency, phase-shifted square waves comprise four square waves, each of the four square waves is phase shifted at least ninety degrees from the other of the four square waves.

26. The system of claim 24, wherein the reader comprises a plurality of amplifiers, each amplifier sums a plurality of the read plurality of the signals.

27. The system of claim 22, wherein the controller comprises a demodulation function configured to demodulate the read plurality of the signals into two values, wherein a set comprising the two values indicates a unique position of the reader along the scale when the controller is operating in the coarse position measurement mode.

28. The system of claim 22, wherein the plurality of scale bars are grouped into a plurality of scale bar groups, each of the plurality of scale bar groups being energized with a different one of the plurality scale signals.

29. The system of claim 24,
wherein the plurality of constant-frequency, phase-shifted square waves comprise four square waves, each of the four square waves is phase shifted at least ninety degrees from the other of the four square waves;
wherein the plurality of scale bars are grouped into four scale bar groups, each of the four scale bar groups being energized with a different one of the plurality of constant-frequency, phase-shifted square waves, each adjacent pair of the four of scale bar groups being energized with by square waves that are phase shifted ninety degrees from the other of the adjacent pair.

30. The system of claim 29, the reader bars positionable along the measurement axis to read the signals from one or two of the plurality of scale bar groups at a given time.

31. The system of claim 22, comprising a measuring probe operatively attached to the reader and configured to engage a work piece.

32. The system of claim 22, wherein the plurality of scale bars comprises thirty-two scale bars, the plurality of reader bars comprise sixteen reader bars, and wherein the reader comprises four amplifiers, each amplifier summing signals read from different sets of the plurality of reader bars; the a plurality of signals comprise a plurality of clocking signals of a given frequency and of different phases, the clocking signals of a given phase are applied to a group of contiguous scale bars of the plurality of scale bars.

33. The system of claim 22, wherein said scale bars comprises four groups of scale bars, the plurality of signals comprise a plurality of clocking signals of a given frequency and of four different phases; the energizer applies the clocking signals of a different given phases to each of the groups of scale bars for generating the coarse position measurement.

34. The system of claim 33, wherein the coarse position measurement comprises an accuracy of about one scale bar of the plurality of scale bars.

35. The system of claim 22, wherein the plurality of signals comprise a first signal and a second signal, the second signal phase-shifted from the first signal, the energizer energizes a first group of the plurality of scale bars with the first signal, the energizer energizes a second group of the plurality of scale bars with the second signal.

36. The system of claim 35, wherein the second signal is phase-shifted ninety degrees from the first signal; the first and seconds signal are of a same frequency.

37. The system of claim 36, wherein the controller comprises a function configured to calculate two values based on the read plurality of the signals, wherein a set comprising the two values indicates a position of the reader that is a fraction of a scale bar pitch along the scale from a fine measurement start scale bar of plurality of scale bars when the controller is operating in a fine position measurement mode, the fine measurement start scale bar determined by the controller based on the coarse position measurement.

38. The system of claim 37 wherein the function calculates each of the two values by obtaining a quotient value form a set of the read plurality of signals.

39. The system of claim 22, wherein
when the coarse position measurement mode,
the energizer generates four coarse measurement phase-shifted signals, each of the four coarse measurement phase-shifted signals is phase shifted at least ninety degrees from the other of the four coarse measurement phase-shifted signals, the plurality of signals are the four coarse measurement phase-shifted signals when in the coarse position measurement mode,
the plurality of scale bars comprise four scale bar groups, each of the four of scale bar groups being energized with a different one of the plurality of phase-shifted signals, each adjacent pair of the four of scale bar groups being energized with by phase-shifted signals that are phase shifted ninety degrees from the other of the adjacent pair,
the controller comprises a coarse position calculation function which is configured to calculate two values based on the read plurality of the signals, wherein a first set comprising the two values indicates a unique coarse position of the reader along the scale when the controller is operating in the coarse position measurement mode, the unique coarse position is the coarse position measurement, the coarse position measurement comprises an accuracy of about one scale bar of the plurality of scale bars; and,
when in a fine position measurement mode,
the energizer generates two fine measurement phase-shifted signals, each of the fine measurement phase-shifted signals is phase shifted at least ninety degrees from the other of the two fine measurement phase-shifted signals, the plurality of signals are the two fine measurement phase-shifted signals when in fine measurement mode,
the plurality of scale bars comprise two scale bar groups, each of the two of scale bar groups being energized with a different one of the fine measurement phase-shifted signals, the two scale bar groups being different from the four scale bar groups of the coarse measurement mode, no two adjacent scale bars of the plurality of sale bars are of the same scale bar group in the fine measurement mode,
the controller comprises a fine position calculation function configured to calculate two values based on the read plurality of the signals, wherein a second set comprising the two values indicates a fine position of the reader that is a fraction of a scale bar pitch along the scale from a fine measurement start scale bar of plurality of scale bars when the controller is operating in the fine position measurement mode, the fine measurement start scale bar determined by the controller based on the coarse position measurement; and,
the controller calculates the final position based on the coarse position measurement and the fine position measurement.

40. An absolute linear position measurement system, comprising:
a scale comprising a plurality of scale bars extending along a measurement axis for a coarse position measurement and a fine position measurement;
an energizer configured to provide the plurality of scale bars with a plurality of scale signals;
a reader comprising a plurality of reader bars extending along the measurement axis, the plurality of reader bars is less than the plurality of scale bars;
the reader moveable relative to the scale along the measurement axis to capacitive couple the plurality of reader bars to a plurality of the plurality of scale bars;
a controller configured to generate the coarse position measurement, the fine position measurement, and a final position based on a plurality of read signals, the read signals resulting from capacitively coupling the reader bars to a plurality of the plurality of scale bars,
the energizer configured to provide the plurality of scale bars with the plurality of scale signals such that the plurality of read signals read by the reader are a unique set of signals for each position of the reader relative to the scale when the controller is operating in a coarse position measurement mode;
a display for displaying the final position.

* * * * *